(12) United States Patent
Newton (10) Patent No.: US 12,132,779 B2
(45) Date of Patent: *Oct. 29, 2024

(54) LOAD DISTRIBUTION ACROSS SUPERCLUSTERS

(71) Applicant: Sandpiper CDN, LLC, Wilmington, DE (US)

(72) Inventor: Christopoher Newton, Westlake Village, CA (US)

(73) Assignee: Sandpiper CDN, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/137,754

(22) Filed: Apr. 21, 2023

(65) Prior Publication Data

US 2023/0254366 A1 Aug. 10, 2023

Related U.S. Application Data

(63) Continuation of application No. 16/816,007, filed on Mar. 11, 2020, now Pat. No. 11,637,893, which is a
(Continued)

(51) Int. Cl.
*H04L 67/1008* (2022.01)
*H04L 49/201* (2022.01)
(Continued)

(52) U.S. Cl.
CPC ........ *H04L 67/1008* (2013.01); *H04L 49/201* (2013.01); *H04L 61/4511* (2022.05);
(Continued)

(58) Field of Classification Search
CPC .............. H04L 67/1008; H04L 67/563; H04L 61/4511; H04L 67/562; H04L 67/568;
(Continued)

(56) References Cited

U.S. PATENT DOCUMENTS 6,389,448 B1 5/2002 Primak et al.
2008/0294732 A1 11/2008 Fletcher
(Continued)

OTHER PUBLICATIONS

Australian Examination Report, dated Dec. 17, 2020, Application No. 2018427212, filed Jun. 22, 2018; 4 pgs.
(Continued)

*Primary Examiner* — Ryan J Jakovac
(74) *Attorney, Agent, or Firm* — C. Tumey Law Group PLLC (57) ABSTRACT

Examples described herein relate to apparatuses and methods for managing communications within a supercluster or across superclusters, including a first supercluster having a plurality of first machines and a publish-subscribe (Pub-Sub) channel to which each of the plurality of first machines is subscribed. A second supercluster has a plurality of second machines and a bridge between the first supercluster and the second supercluster. A first machine is configured to receive, via the bridge, an availability status and resource allocation information of each second machine and publish, on the Pub-Sub channel of the first supercluster, the availability status and the resource allocation information.

20 Claims, 6 Drawing Sheets

Related U.S. Application Data continuation of application No. 16/002,919, filed on Jun. 7, 2018, now Pat. No. 10,594,782.

(51) Int. Cl.
  *H04L 61/4511* (2022.01)
  *H04L 67/1014* (2022.01)
  *H04L 67/1021* (2022.01)
  *H04L 67/562* (2022.01)
  *H04L 67/563* (2022.01)
  *H04L 67/568* (2022.01)

(52) U.S. Cl.
  CPC ...... *H04L 67/1014* (2013.01); *H04L 67/1021* (2013.01); *H04L 67/562* (2022.05); *H04L 67/563* (2022.05); *H04L 67/568* (2022.05)

(58) Field of Classification Search
  CPC .............. H04L 49/201; H04L 67/1014; H04L 67/1021
  See application file for complete search history.

(56) References Cited

U.S. PATENT DOCUMENTS

| | | |
|---|---|---|
| 2010/0322236 A1 | 12/2010 | Vimpari |
| 2013/0173806 A1 | 7/2013 | Newton et al. |
| 2015/0029851 A1 | 1/2015 | Haydock |
| 2019/0103990 A1 | 4/2019 | Cidon |
| 2020/0213388 A1 | 7/2020 | Newton |

OTHER PUBLICATIONS

International Search Report and Written Opinion of the International Searching Authority, dated Apr. 4, 2019, Int'l Appl. No. PCT/US18/039032, Int'l Filing Date Jun. 22, 2081; 16 pgs.

Invitation to Pay Additional Fees, dated Feb. 14, 2019, Int'l Appl. No. PCT/US18/039032, Int'l Filing Date Jun. 22, 2018; 13 pgs.

Japanese Notice of Reasons for Refusal, dated Jan. 26, 2022, Application No. 2020-567564, filed Jun. 22, 2018; 4 pgs.

Canadian Examination Report, dated May 31, 2023, Application No. 3103126, filed Jun. 22, 2018; 5 pgs.

LOAD DISTRIBUTION ACROSS SUPERCLUSTERS

TECHNICAL FIELD

The present technology relates generally to distributing content within and across superclusters in a network, such as a Content Delivery Network (CDN).

BACKGROUND

A datacenter may include one or more superclusters, each of which may include machines capable of data storage and data processing. Typically, each supercluster spans a number of racks (or physical clusters) within the datacenter. In some implementations, one or more superclusters can be used in a Content Delivery Network (CDN).

A CDN is a geographically distributed network of servers (each of which is referred to as a CDN node) for facilitating an origin server to distribute content data of the origin server to clients that consume the content data. To distribute to clients that are remote to the origin server, a CDN node in geographical proximity to the clients can provide the content data to those clients on behalf of the origin server. In particular, the CDN node can replicate and cache the content data of the origin server and provide the replicated and cached content data to the clients. Some CDN nodes are referred to as "edge nodes" given the proximity of those CDN nodes to the clients.

A supercluster can be used to implement one or more nodes of a CDN. For example, a node can be implemented by a machine of a supercluster. A supercluster can be used to implement edge nodes of a CDN. In that regard, each machine in the supercluster is cache-responsible for at least some portion (e.g., at least one slice) of a total library of content data. The total library is defined by a set of properties that are bound to one or more superclusters. As such, the slices making up the total library are allocated to machines in one or more superclusters.

Machines in a supercluster can become unavailable for various reasons, including predetermined/scheduled unavailability (e.g., maintenance, and the like) and unexpected/sudden unavailability (e.g., non-responsiveness, slow processing, power interruption, and the like). If a primary machine storing a given slice is unavailable, a secondary machine storing the slice can be selected to provide the slice to a client. A consistent hashing algorithm is used to select which slice a given resource/machine is assigned. The consistent hashing algorithm iterates over a list of machines. The order of the machines on the list can be determined based on a source key (such as a canonicalized version of the requested Uniform Resource Locator (URL) in a CDN). In this manner, responsive to a machine being determined to be unavailable, the content data for which the unavailable machine is responsible may be spread over a number (ideally all) of the other machines in the supercluster, thus avoiding hotspots. A hotspot refers to one or more popular slices being stored and provided by a given machine of the supercluster, such that the machine is burdened with a significant amount of traffic and processing. If a sufficient number of machines in a given supercluster become offline, remaining machines can be overwhelmed by additional load due to unavailable resources. A conventional datacenter offers inadequate communications among machines or groups of machines in relation to conveying machine status and availability information.

BRIEF SUMMARY

Embodiments are provided for a supercluster that includes a plurality of machines and a publish-subscribe (Pub-Sub) channel to which each of the plurality of machines is subscribed. Each of the plurality of machines is configured to publish availability status and resource allocation information to the Pub-Sub channel, receive availability status and resource allocation information of at least another one of the plurality of machines via the Pub-Sub channel, and forward a request received from a client for content data to the another one of the plurality of machines based on the availability status and the resource allocation information on the Pub-Sub channel.

The availability status indicates whether each of the plurality of machines is available to store content data. The resource allocation information identifies the content data stored by each of the plurality of machines. The Pub-Sub channel preferably includes a multicast address.

In accordance with one aspect, forwarding the request received from the client for the content data to the another one of the plurality of machines based on the availability status and the resource allocation information on the Pub-Sub channel includes to receive, by a first machine of the plurality of machines, the request for the content data from the client, to determine, by the first machine, that the first machine does not store the content data, to determine, based on the availability status and the resource allocation information on the Pub-Sub channel, that the content data is stored on a second machine of the plurality of machines, and to forward the request to the second machine.

A first machine of the plurality of machines may own content data owned by a second machine of the plurality of machine based on the availability status and the resource allocation information on the Pub-Sub channel.

To own the content data currently owned by the second machine, the first machine may identify, based on the availability status and the resource allocation information on the Pub-Sub channel, the content data owned by the second machine, publish, to the Pub-Sub channel, availability to own the content data owned by the second machine, receives, from the second machine via the Pub-Sub channel, authorization from the second machine, own the content data owned by the second machine, receives, from a third machine of the plurality of machines, a relayed request for the content data, and provide the content data in response to the relayed request.

To own the content data currently owned by the second machine, the first machine may determine, based on the availability status and the resource allocation information on the Pub-Sub channel, that a number of second machines currently storing the content data is below a threshold, publish, to the Pub-Sub channel, availability to own the content data, receives, via the Pub-Sub channel, authorization from the second machines currently storing the content data, own the content data, receives, from a third machine of the plurality of machines, a relayed request for the content data, and provide the content data in response to the relayed request.

A first machine of the plurality of machines may be configured to establish a bridge to a second machine in another supercluster. The another supercluster preferably neighbors the supercluster and may be the geographically closest supercluster. The bridge is configured to relay, to the first machine, an availability status and resource allocation information of each of at least some machines of the another supercluster.

The first machine may determine, based on the availability status of the plurality of machines on the Pub-Sub channel, that a number of unavailable machines of the plurality of machines exceeds a threshold. The bridge may be established in response to determining that the number of unavailable machines exceeds the threshold. The bridge may include a Transmission Control Protocol (TCP) connection. The first machine may identify the other supercluster based on geographical proximity to the supercluster. The first machine may identify that the other supercluster is adjacent to the supercluster by making a Domain Name System (DNS) request. The first machine may publish the availability status and the resource allocation information of the at least some machines of the other supercluster on the Pub-Sub channel.

A third machine of the supercluster may receive the request from the client for the content data, determine, based on the resource allocation information of the at least some machines of the another supercluster on the Pub-Sub channel, that the content data is stored by a fourth machine of the another supercluster, and forward the request to the fourth machine.

In accordance with one aspect, a method for distributing loads across a plurality of machines of a supercluster includes publishing, by each of the plurality of machines of the supercluster, availability status and resource allocation information to a Pub-Sub channel, wherein each of the plurality of machines is subscribed to the Pub-Sub channel, receiving availability status and resource allocation information of at least another one of the plurality of machines via the Pub-Sub channel, and forwarding a request received from a client for content data to the another one of the plurality of machines based on the availability status and the resource allocation information on the Pub-Sub channel.

In accordance with another aspect, a non-transitory computer-readable medium having computer-readable instructions such that, when executed, cause a processor of each of a plurality of machines of a supercluster to publish availability status and resource allocation information to a Pub-Sub channel, wherein each of the plurality of machines is subscribed to the Pub-Sub channel, receive availability status and resource allocation information of at least another one of the plurality of machines via the Pub-Sub channel, and forward a request received from a client for content data to the another one of the plurality of machines based on the availability status and the resource allocation information on the Pub-Sub channel.

In accordance with another aspect, a method for distributing loads across superclusters includes determining, by a first machine of a first supercluster, that a number of unavailable machines in the first supercluster exceeds a threshold, establishing, by the first machine, a bridge with a second machine in a second supercluster, wherein the second supercluster is adjacent to the first supercluster, receiving, by the first machine via the bridge, availability status and resource allocation information of each of a plurality of machines of the second supercluster, and publishing, by the first machine on a Pub-Sub channel of the first supercluster, the availability status and the resource allocation information of each of the plurality of machines of the second supercluster.

The availability status may indicate whether each of the plurality of machines of the second supercluster is available to store content data. The resource allocation information may identify the content data for which each of the plurality of machines of the second supercluster is responsible.

The method further permits publishing, by a plurality of machines of the first supercluster on the Pub-Sub channel of the first supercluster, availability status and resource allocation information of each of the machines of the first supercluster. The number of unavailable machines in the first supercluster may be determined based on the availability status provided on the Pub-Sub channel of the first supercluster. The Pub-Sub channel of the first supercluster may include a multicast address.

The method may further include receiving, by a third machine of the first supercluster from a client, a request for content data, determining, by the third machine based on the availability status and the resource allocation information of each of the plurality of machines of the second supercluster on the Pub-Sub channel, that the content data is stored by a fourth machine of the second supercluster, and forwarding the request to the fourth machine in the second supercluster. This bridge may include a TCP connection. The method further permits including identifying, by the first machine, the second supercluster based on geographical proximity to the first supercluster. The first machine may identify that the second supercluster is adjacent to the first supercluster by making a DNS request.

In accordance with another aspect, a non-transitory computer-readable medium having computer-readable instructions such that, when executed, cause a processor of a first machine of a first supercluster to determine that a number of unavailable machines in the first supercluster exceeds a threshold, establish a bridge with a second machine in a second supercluster, wherein the second supercluster is adjacent to the first supercluster, receive, via the bridge, availability status and resource allocation information of each of a plurality of machines of the second supercluster, and publish, on a Pub-Sub channel of the first supercluster, the availability status and the resource allocation information of each of the plurality of machines of the second supercluster.

In accordance with another aspect, a system includes a first supercluster, wherein the first supercluster includes a plurality of first machines, and a Pub-Sub channel to which each of the plurality of first machines is subscribed, a second supercluster, wherein the second supercluster includes a plurality of second machines, and a bridge between the first supercluster and the second supercluster. One of the plurality of first machines is configured to receive, from one of the plurality of second machines via the bridge, an availability status and resource allocation information of each of the plurality of second machines, and publish, on the Pub-Sub channel of the first supercluster, the availability status and the resource allocation information of each of the plurality of second machines.

These and other features, together with the organization and manner of operation thereof, will become apparent from the following detailed description when taken in conjunction with the accompanying drawings.

DETAILED DESCRIPTION

Arrangements described herein relate to systems, apparatuses, methods, and non-transitory computer-readable media for providing hive-awareness in relation to sharing or otherwise distributing content (e.g., a total library of content data) across machines of a given supercluster or across machines of two or more superclusters. Each machine can store a portion of the content (e.g., a slice or slot of the total library). Each machine can communicate with other machines within a same supercluster and/or other machines in another supercluster to identify the portion stored by the machines.

A datacenter can include two or more superclusters. Arrangements described herein provide for machines within a supercluster to communicate with each other regarding resource allocation and provision in the manner described. Further arrangements provide for machines of two superclusters to communicate with each other regarding resource allocation and provision. As such, rather than machines of a given supercluster rolling over from one to another responsive to a significant number of machines being offline in that supercluster, some slices handled by the machines of that supercluster can instead be serviced by machines in at least one other supercluster. The at least one other supercluster may be an adjacent supercluster. In some examples, a given datacenter may include a single supercluster. In that case, the nearest supercluster may be hosted in another datacenter.

Accordingly, arrangements described herein address various technical problems in relation to a datacenter providing contents to clients (e.g., in a CDN context), including conveying resource allocation data between machines (nodes) in a first supercluster, determining one or more appropriate neighboring superclusters (referred to herein as second superclusters), and integrating the first and second superclusters responsive to determining that a number of failed or degraded nodes in the first supercluster exceeds a threshold.

Traditionally, a DNS name is provided for each slice of a total library. Each machine is responsible for storing a slice corresponding to a DNS name. DNS resolutions can direct a client to a particular machine that stores the requested slice. For a large total library that may have a large number of slices, such traditional implementation becomes unmanageable. Arrangements described herein do not require a DNS name to be assigned for each slot in the total library. Instead, the machines in a supercluster can communicate with each other with respect to availability status and resource allocation to determine which machine can service the requested slice. If the machines in the same supercluster cannot provide the requested slice, the request can be forwarded to a machine in another supercluster based on the availability status or the resource allocation information shared between the superclusters.

Figure 1:
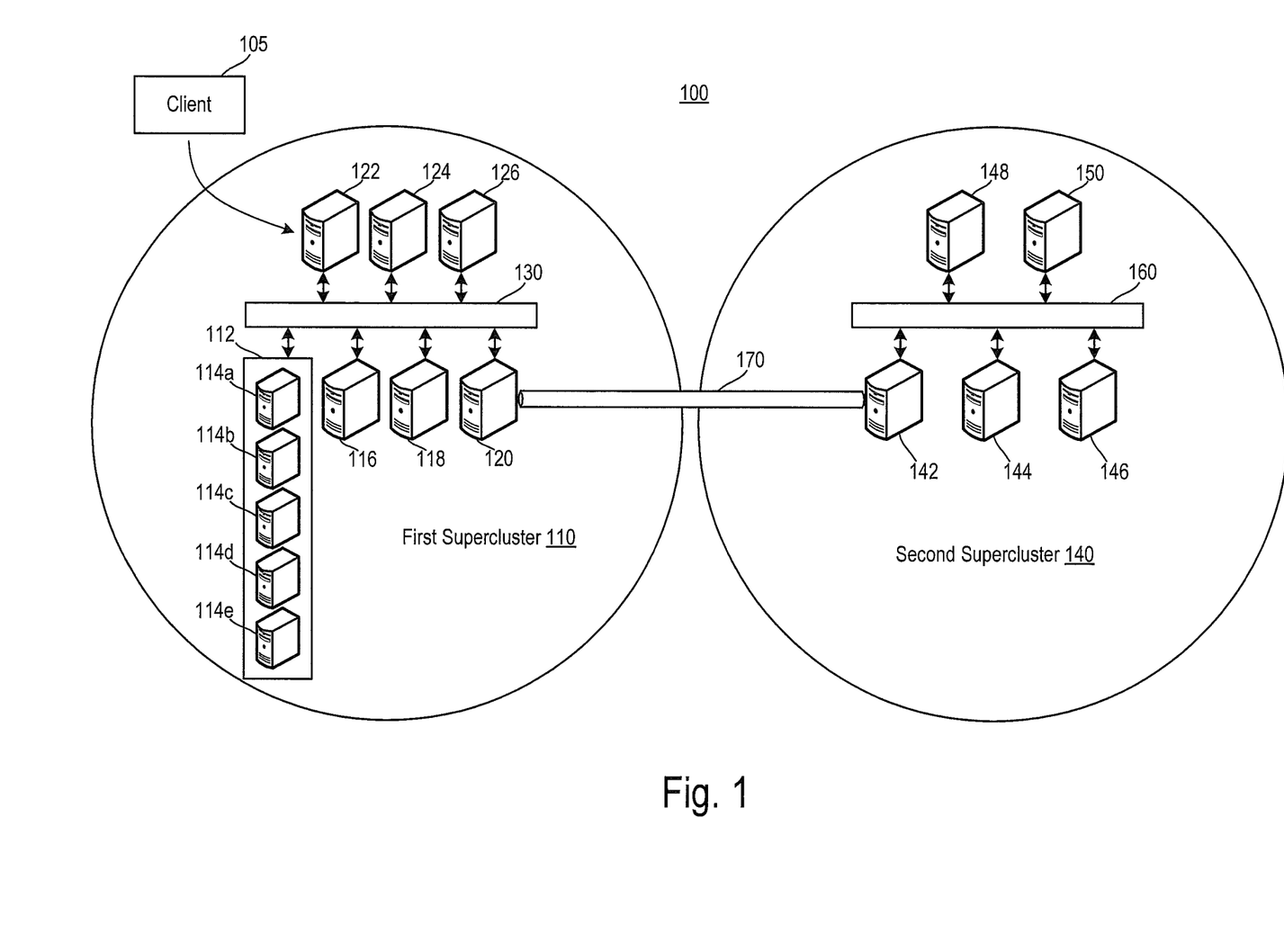
FIG. 1 is a diagram showing an example of a system for providing communications within a supercluster and among multiple superclusters in accordance with the present disclosure.

FIG. 1 is a diagram of an exemplary system 100 for providing communications within a supercluster and among multiple superclusters according to some arrangements of the present disclosure. Referring to FIG. 1, a CDN can be implemented using the system 100. A CDN is a geographically distributed network of servers or machines (each of which is a CDN node) for facilitating an origin server (not shown) to distribute content data of the origin server to clients (e.g., a client 105) that consume the content data. To distribute the content data from the origin server to a client that is remote to the origin server, a CDN node in geographical proximity to the client can provide the content data to the client on behalf of the origin server. In particular, the CDN node can replicate and cache the content data (or at least a portion thereof) of the origin server and provide the replicated and cached content data to the client. A customer of the CDN may be associated with the origin server.

The system 100 includes at least a first supercluster 110 and a second supercluster 140. Each supercluster may include a plurality of machines. For example, the first supercluster 110 includes machines 114a-114e and 116-126. The second supercluster 140 includes machines 142-150. The machines of a same supercluster are in a same geographical location and/or positioned in a same physical location. For example, the machines 114a-114e and 116-126 of the first supercluster 110 are at a first location while the machines 142-150 of the second supercluster 140 are at a second location different from the first location. In other examples, the first and second location may be the same location (e.g., the superclusters 110 and 140 are located at a same datacenter with or without intermingled racks). The first and second superclusters 110 and 140 neighbor or are adjacent to one another in the context of the CDN. Thus, communications between a machine (e.g., the machine 120) of the first supercluster 110 and a machine (e.g., the machine 142) of the second supercluster 140 are faster than those between a machine of the first supercluster 110 and a machine of another supercluster of the same CDN. The first and second superclusters 110 and 140 belong to a same datacenter. Alternatively, the first and second superclusters 110 and 140 belong to different datacenters.

Furthermore, the machines in each supercluster can be a rack of machines. For example, the first supercluster 110 includes a rack 112 of the machines 114a-114e. The machines 114a-114e are bounded together via a virtual IP address. The machines 114a-114e may store the same content data. Alternatively, at least one of the machines 114a-114e stores different content data relative to that stored by other ones of the machines 114a-114e. The rack 112 can provide load balancing capability in the stack of machines 114a-114e. For example, responsive to a client request, a switch in the rack 112 can select one of the machines 114a-114e to service the client request. While only one rack 112 is shown for the first supercluster 110 in FIG. 1, the first supercluster 110 and the second supercluster 140 may have any number of racks of machines. Each rack configuration in the first supercluster 110 and/or the second supercluster 140 may be structured in a similar manner as rack 112. Each of the machines 116-126 and 142-150 is preferably individually addressed with a physical IP address.

Each supercluster is defined by a binding of machines associated therewith. In one example, a mapping between host names and machines can be used to define or otherwise form a supercluster. Within a CDN context, the host names and the machines are configured to serve a same set of at least one customer of the CDN. Each customer may be associated with an origin server. The machines 114a-114e and 116-126 are bound together (through suitable mapping between host names and the machines 114a-114e and 116-

126) to form the first supercluster 110. Similarly, the machines 142-150 are bound together (through suitable mapping between host names and the machines 142-150) to form the second supercluster 140. In addition, given that superclusters can be located in different locations, superclusters can be used to implement any geographical restrictions (e.g., certain contents can or cannot be served in certain geographical locations) and/or geographically based security protocols as needed by the CDN.

Clients (e.g., the client 105) are end users that can connect to one of the machines supporting nodes of the CDN. Each node of the CDN corresponds to one of the machines 114a-114e, 116-126, and 142-150. The CDN may be implemented with additional superclusters and machines not shown. The machines 114a-114e and 116-126 of the first supercluster 110 are edge nodes of a CDN, serving nearby clients including the client 105. Similarly, the machines 142-150 can also be edge nodes of the CDN, servicing clients in geographical proximity with the second supercluster 140. The client 105 can be directed to connect to the rack 112 or one of the machines 116-126 using DNS operations, such as but not limited to a DNS lookup or a domain name resolution. As shown, results of a DNS lookup based on a request by the client 105 direct the client 105 to receive requested content data from the machine 122. The DNS lookup based on the request by the client 105 does not resolve to a machine in the second supercluster 140 or another supercluster of the CDN, given that the client 105 is closer to a location of the first supercluster 110 than another location of another supercluster of the CDN. The request includes at least a URL.

Each machine in a supercluster stores a portion of a total library of contents for the set of at least one customer of an associated CDN. For example, each of the machines 114a-114e and 116-126 in the first supercluster 110 is cache-responsible for at least one slice of a total library. Each of the machines 142-150 in the second supercluster 140 is cache-responsible for at least one slice of the total library. The total library is defined by a set of properties that are bound to one or more superclusters. Library refers to, generally, a working set of the library that is stored by the one or more superclusters. As such, each supercluster 110 or 140 stores the total library, and the total library is allocated (e.g., in portions or in slices) to machines in each supercluster 110 or 140. In other words, the total library is stored by both the superclusters 110 and 140. A same slice of the total library may be stored by multiple machines of a same supercluster for redundancy. In other arrangements, one or more nodes or machines of a supercluster may not have storage capabilities but are still a part of the supercluster.

A "working set" of a library refers to a portion of the total library of a subscriber that is being actively used and hence would have been filled into the caches. Each of the machines 114a-114e and 116-126 of the first supercluster 110 can include two sections of storage. A first storage section stores an assigned portion or slice (referred to as a slice of the working set) of the total library. A second storage section stores popular content data of the total library. If a given slice of the total library is frequently requested by clients connecting to the first supercluster 110, then the frequently requested slice becomes popular content data and is stored in the second storage section of other machines in the first supercluster 110. Each of the machines 114a-114e and 116-126 of the first supercluster 110 can receive a request (e.g., a request form the client 105) for any slice of the total library, irrespective of whether the machine receiving the request stores the requested slice.

In one example, responsive to the machine 122 in the first supercluster 110 receiving a request from the client 105 for an object, the machine 122 provides the object to the client if the machine 122 stores that slice. As referred to herein, a "requested slice" refers to a slice associated with an object requested by the client 105. The requested slice may be stored in either the first storage section (working set) or the second storage section (popular content). On the other hand, if the machine 122 does not store the requested slice associated with the requested object, the machine 122 requests the requested slice from another one machine in the first supercluster 110 that stores the requested slice. In other words, the machine 122 forwards the request to another machine in the first supercluster 110.

In order to forward the request to another machine in the first supercluster 110, a communication channel for the machines 114a-114e and 116-126 of the first supercluster 110 can be provided to allow the machines 114a-114e and 116-126 to communicate availability status and resource allocation information with each other. The availability status indicates whether an associated machine is available to store and/or provide content data (e.g., at least one slice). The resource allocation information identifies the content data (e.g., at least one slice) stored by an associated machine.

As described, a request from a client (e.g., the client 105) can be resolved to any of the machines 114a-114e and 116-126 in the first supercluster 110 based on DNS operations. If the first supercluster 110 has a large number of machines, there is a high probability that the requested slice is not stored by the machine (e.g., the machine 122) that first received the request from the client.

Problems with traditional superclusters relate to the fact that machines of a supercluster come online and go offline for various reasons. For example, a machine in a supercluster can become offline for predetermined/scheduled unavailability such as, but not limited to, maintenance. A machine in a supercluster can become offline for unexpected/sudden unavailability such as, but not limited to, non-responsiveness, slow processing, and power interruption.

If a machine known to store a requested slice is offline, the machine 122 that first receives the request checks within the first supercluster 110 will see if another machine in the first supercluster 110 can provide the requested slice. For example, if the machine 122 determines that the machine 116 known to store the requested slice is offline, the machine 122 checks within the first supercluster 110 to determine that the machine 118 also stores the requested slice.

In that regard, the machines 114a-114e and 116-126 subscribe to a Pub-Sub channel 130. In one example, the Pub-Sub channel 130 is a data stream that can be subscribed to by the machines 114a-114e and 116-126. Each of the machines 114a-114e and 116-126 can publish its own availability status and resource allocation information on the Pub-Sub channel 130. Each of the machines 114a-114e and 116-126 can also obtain the availability status and resource allocation information for other machines of the first supercluster 110 from the Pub-Sub channel 130. As such, any of the machines 114a-114e and 116-126 at any time can identify a machine within the first supercluster 110 that is available to provide a requested slice. An example of the Pub-Sub channel 130 is a multicast address. A Pub-Sub channel 160 associated with the second supercluster 140 is a data stream that may be configured in the same manner as the Pub-Sub channel 130. For example, each of the machines 142-150 can publish its own availability status and resource allocation information on the Pub-Sub channel 160. Each of the machines 142-150 can also obtain the availability status and resource allocation information for other machines of the second supercluster 140 from the Pub-Sub channel 160. As such, the Pub-Sub channel 130 and the Pub-Sub channel 160 provide hive awareness within the first supercluster 110 and the second supercluster 140, respectively.

In some example, a single machine of a supercluster is cache-responsible for a given slice. If that machine is offline, a second machine of the supercluster is determined based on configuration information, where the same second machine is selected by all members of the supercluster for that slice. In some examples, as the supercluster detects, for example, that the machine 116 is offline, another machine (e.g., the machine 118) of the first supercluster 110 becomes cache-responsible for (e.g., takes over ownership of) that slice. The machine 118 may announce that the machine 118 is cache-responsible for the slice on the Pub-Sub channel 130. Until then, in some examples, each machine of the first supercluster 110 may goes up a CDN hierarchy to a next tier of the CDN to obtain the slice, until the slice re-allocation within the first supercluster 110 has been finalized, or until the hashing algorithm that is used to identify the slice for a requested object returns a sequence of machines within the first supercluster 110. For example, in identifying a slice corresponding to a requested object, the hash algorithm can return a list of slice numbers (1, 2, 3, . . . x). The first element (e.g., 1) of the list is the preferred slice for the requested object. That is, slice 1 is currently "owned" by the machine 116. Responsive to determining that the machine 116 is offline, the request is sent to the machine 118 that "owns" slice 2.

If a number of offline machines exceeds a threshold in the first supercluster 110, the rest of the machines in the first supercluster 110 may be overloaded. Thus, a machine in the first supercluster 110 can communicate with a machine in a nearby or neighboring supercluster (e.g., the second supercluster 140) and can forward the request to a machine in the nearby or neighboring supercluster. The communications between the superclusters 110 and 140 can be accomplished by a bridge 170. An example of the bridge 170 is a TCP connection.

The bridge 170 can be established between a machine (e.g., the machine 120) of the first supercluster 110 and a machine (e.g., the machine 142) of the second supercluster 140. The machine 120 can identify the second supercluster 140 or the machine 142 based on geographical proximity. For example, the machine 120 can identify that the second supercluster 140 and/or the machine 142 is adjacent to the first supercluster 110 by making a proximity request (e.g., a DNS request). In some arrangements, the proximity request may use the same or similar rendezvous system as that of a DNS request, such that a client of the CDN can use the rendezvous system to determine that the second supercluster 140 and/or the machine 142 are adjacent to the first supercluster 110. The availability status and the resource allocation information for machines of both the first supercluster 110 and the second supercluster 140 can be shared via the bridge 170. For example, the machine 120 can extract the availability status and resource allocation information of the machines 114a-114e and 116-126 of the first supercluster 110 from the Pub-Sub channel 130 and send the availability status and resource allocation information via the bridge 170 to the machine 142. The machine 142 can publish the availability status and resource allocation information of the machines 114a-114e and 116-126 to the Pub-Sub channel 160, making that data available to the machines 144-150 of the second supercluster 140. Similarly, the machine 142 can extract the availability status and resource allocation information of the machines 142-150 of the second supercluster 140 and send the availability status and resource allocation information via the bridge 170 to the machine 120. The machine 120 can publish the availability status and resource allocation information of the machines 142-150 to the Pub-Sub channel 130, making that data available to the machines 114a-114e and 116-126 of the first supercluster 110. In some examples, the proximity selection described herein takes into account the situation in which the first supercluster 110 is impaired and the second supercluster 140 is not impaired in determining the nearest supercluster (e.g., the second supercluster 140). In that sense, then the bridge 170 may only need to convey load and slice-allocation information in one direction (e.g., from the machine 142 to the machine 120). As such, the machines 114a-114e and 116-126 in the first supercluster 110 need to know which machines from the second supercluster 140 are available to serve content to the machines 114a-114e and 116-126, while the machines 142-150 in the second supercluster 140 continues to take slices from the machines 142-150 in the second supercluster 140.

Figure 2:
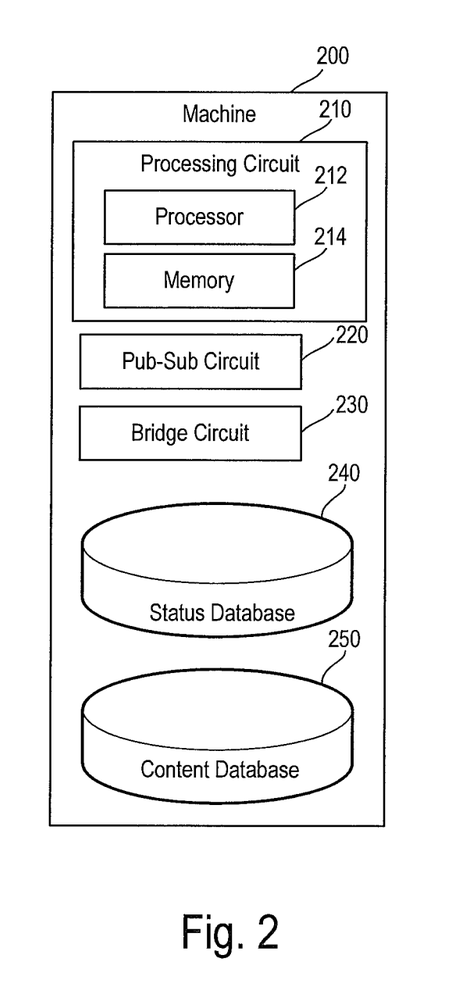
FIG. 2 is a block diagram that illustrates an example of a machine of a supercluster.

FIG. 2 is a block diagram that illustrates a machine 200 according to some arrangements. Referring to FIGS. 1-2, the machine 200 is an example of any of the machines 114a-114e, 116-126, and 142-150. As shown, the machine 200 includes one or more of a processing circuit 210, a Pub-Sub circuit 220, a bridge circuit 230, a status database 240, and a content database 250.

The processing circuit 210 is configured to perform various functions described herein relative to the machine 200. The processing circuit 210 includes a processor 212 and a memory 214. The processor 212 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 214 can be implemented with a Random Access Memory (RAM), Read-Only Memory (ROM), Non-Volatile RAM (NVRAM), flash memory, hard disk storage, or another suitable data storage unit. The memory 214 stores data and/or computer code for facilitating the various processes executed by the processor 212. Moreover, the memory 214 is or includes tangible, non-transient volatile memory or non-volatile memory. Accordingly, the memory 214 includes database components, object code components, script components, or any other type of information structure for supporting the various functions described herein.

The Pub-Sub circuit 220 includes suitable hardware and software configured to communicate via, establish, and/or connect to a Pub-Sub channel (e.g., the Pub-Sub channel 130 or 160). For example, the Pub-Sub circuit 220 may be a suitable network interface that includes a cellular transceiver (configured for cellular standards), a local wireless network transceiver (for 802.11X, ZigBee, Bluetooth, Wi-Fi, or the like), a wired network (e.g., Ethernet, an optical network such as SONET, DWDM, OTN) interface, a combination thereof (e.g., both a cellular transceiver and a Bluetooth transceiver), and/or the like. The Pub-Sub circuit 220 can enable one or more of wireless network multicast, datalink layer multicast (e.g., Ethernet multicast), internet layer multicast (e.g., Internet Protocol (IP) multicast), application layer multicast, and another suitable type of multicast. In that regard, the Pub-Sub channel 130 or 160 may further include one or more suitable networks (e.g., a cellular network, a local wireless network, a wired network, a combination thereof, and/or the like) to which the machines of a supercluster connect. The Pub-Sub circuit 220 may include processing capabilities provided by the processing circuit 210 and/or another suitable processing circuit.

The Pub-Sub circuit 220 can publish the availability status and the resource allocation information of the machine 200 to the Pub-Sub channel 130 or 160. Responsive to the machine 200 becoming online and about to become offline, the Pub-Sub circuit 220 publishes a respective one of an online notification and an offline notification to the Pub-Sub channel 130 or 160. For example, if the machine 200 is being cleanly and orderly shutdown, then the machine 200 can send the offline notification, and goes into a "draining" state such that an orderly transition of slices the machine 200 is currently responsible for can be made to other machines of the same supercluster. However, frequently the machine 200 is abruptly terminated instead of being cleanly and orderly shutdown. In situations in which the machine 200 is abruptly terminated, an absence of messages from the machine 200 for a predetermine period of time (e.g., 10 seconds, 30 seconds, 1 minute, 5 minutes, and the like) can trigger another machine of the same supercluster or a managing device to generate and send the offline notification via a Pub-Sub channel of the supercluster such that other machines of the supercluster are notified. Further, the Pub-Sub circuit 220 publishes the resource allocation information responsive to one or more of the machine 200 becoming online, at least one slice being assigned to the machine 200, any modifications to an assigned slice (e.g., removal or change of a slice), and the like. The sent resource allocation information corresponds to current slices stored in the content database 250 by the machine 200. The Pub-Sub circuit 220 may send the online notification, the offline notification, and the resource allocation information to a multicast address corresponding to the Pub-Sub channel 130 or 160. Then, copies of the sent information can be automatically generated and sent to recipients (e.g., machines in the same supercluster) covered by the multicast address by associated network elements such as but not limited to, routers, switches, cellular network base stations, and the like. In that regard, the Pub-Sub channel 130 or 160 further includes the associated network elements.

In addition, the Pub-Sub circuit 220 can receive the online notification, the offline notification, and the resource allocation information of other machines in the same supercluster as the machine 200 from the Pub-Sub channel 130 or 160. By virtue of the fact that the multicast address associated with the Pub-Sub channel 130 or 160 also identifies a suitable address for the machine 200, the Pub-Sub circuit 220 can receive the online notification, the offline notification, and the resource allocation information of other machines in the same supercluster.

The bridge circuit 230 includes suitable hardware and software configured to communicate via, establish, and/or connect, to a bridge (e.g., the bridge 170). For example, the bridge circuit 230 may be a suitable network interface that includes a cellular transceiver (configured for cellular standards), a local wireless network transceiver (for 802.11X, ZigBee, Bluetooth, Wi-Fi, or the like), a wired network (e.g., Ethernet, an optical network such as SONET, DWDM, OTN) interface, a combination thereof (e.g., both a cellular transceiver and a Bluetooth transceiver), and/or the like. The bridge circuit 230 and the Pub-Sub circuit 220 may share one or more of the cellular transceiver, the local wireless network transceiver, and/or the wired network interface. The bridge circuit 230 can enable, for example, a TCP connection with another machine (such as but not limited to, the machine 200) of another supercluster. In that regard, the bridge circuit 230 supports the IP standard. The bridge circuit 230 may include processing capabilities provided by the processing circuit 210 and/or another suitable processing circuit.

The bridge circuit 230 can receive the availability status and the resource allocation information of the machines in a same supercluster as the machine 200 from the status database 240 and send such availability status and resource allocation information to a machine of another supercluster the bridge 170 (e.g., via a TCP connection).

The status database 240 is a memory device having data structures implemented to organize and store the availability status and the resource allocation information of each machine in a same supercluster as the machine 200 (as received via a Pub-Sub channel of the supercluster) and the availability status and the resource allocation information of one or more machines of at least another supercluster different from the supercluster of the machine 200 (as received via a bridge). Responsive to the Pub-Sub circuit 220 and the bridge circuit 230 receiving the availability status and the resource allocation information, the availability status and the resource allocation information are stored in the status database 240. As such, real-time updates of the availability status and the resource allocation information can be stored in the status database 240, enabling hive-awareness.

The content database 250 is a memory device having data structures implemented to organize and store the portions or slices of content data assigned to the machine 200. The content database 250 includes two separate storage sections in some examples. A first storage section stores an assigned portion or slice (referred to as a "working set") of the total library. A second storage section stores popular content data of the total library. If a given slice of the total library is frequently requested by clients, then the frequently requested slice becomes popular content data and is stored in the second storage section of the content database 250.

Figure 3:
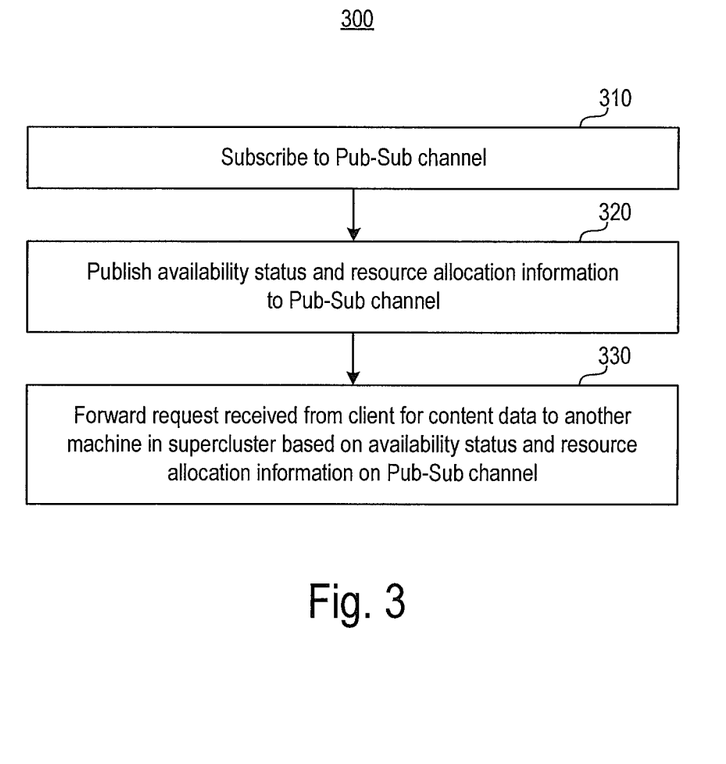
FIG. 3 is a flow diagram illustrating an exemplary method for providing communications within a supercluster.

FIG. 3 is a flow diagram illustrating an example of a method 300 for providing communications within the supercluster 110 according to various arrangements. Referring to FIGS. 1-3, the method 300 is concerned with providing hive-awareness within the supercluster 110 using the Pub-Sub channel 130. Further, the Pub-Sub channel 130 and the bridge 170 provide for hive-awareness across two neighboring superclusters 110 and 140. One of ordinary skill in the art can appreciate that each machine of the first supercluster 110 and the second superclusters 140 can perform the functions described for particular machines in connection with the method 300.

At 310, a machine (e.g., the machine 122, which can be implemented in the manner described with respect to the machine 200) subscribes to the Pub-Sub channel 130. The Pub-Sub circuit 220 of the machine 122 subscribes to the Pub-Sub channel 130 by configuring sending and receiving data via the multicast address corresponding to the Pub-Sub channel 130 in some examples.

At 320, the machine 122 publishes the availability status and the resource allocation information of the machine 122 to the Pub-Sub channel 130. The Pub-Sub circuit 220 of the machine 122 sends the availability status and the resource allocation information of the machine 122 to the multicast address. Such information can be replicated and delivered to addresses corresponding to other machines in the first supercluster 110. The addresses corresponding to the other machines in the first supercluster 110 correspond to the multicast address. The machine 122 can likewise receive the availability status and the resource allocation information of other machines in the first supercluster 110 via the Pub-Sub channel 130.

A 330, the machine 122 forwards a request received from the client 105 for content data to another machine of the first supercluster 110 based on the availability status and the resource allocation information on the Pub-Sub channel 130. For example, the processing circuit 210 of the machine 122 checks whether the slice requested by the client 105 is stored in the content database 250. Responsive to determining that the slice is not stored in the content database 250 of the machine 122, the machine 122 determines, based on the availability status and the resource allocation information of other machines in the first supercluster 110 received via the Pub-Sub channel 130, that the requested slice is stored on another machine (e.g., the machine 126) of the first supercluster 110. For example, the processing circuit 210 searches the status database 240, using the requested slice as criteria, to identify the machine 126 that stores the requested slice. Upon identifying the machine 126, the processing circuit 210 of the machine 122 forwards the request to the machine 126. The machine 126 provides the requested slice (e.g., the object associated thereto) to the client 105 in any suitable manner. In some examples, forwarding the request includes the machine 122 proxying the request to the machine 126, such that the machine 122 is serving as a proxy for the machine 126 (e.g., the request is forwarded to the machine 126 and the response flows through the machine 122). In some examples, forwarding the request includes the connection being migrated over to the machine 126, so that the machine 126 can provide the response (e.g., the object) to the client 105 directly. In some examples, forwarding the request includes the machine 126 using Direct Server Return to deliver the response (e.g., the object) to the client 105. In some examples, forwarding the request includes the machine 122 returning a redirect message to the client 105 so that the client 105 can be redirected to the machine 126.

Figure 4:
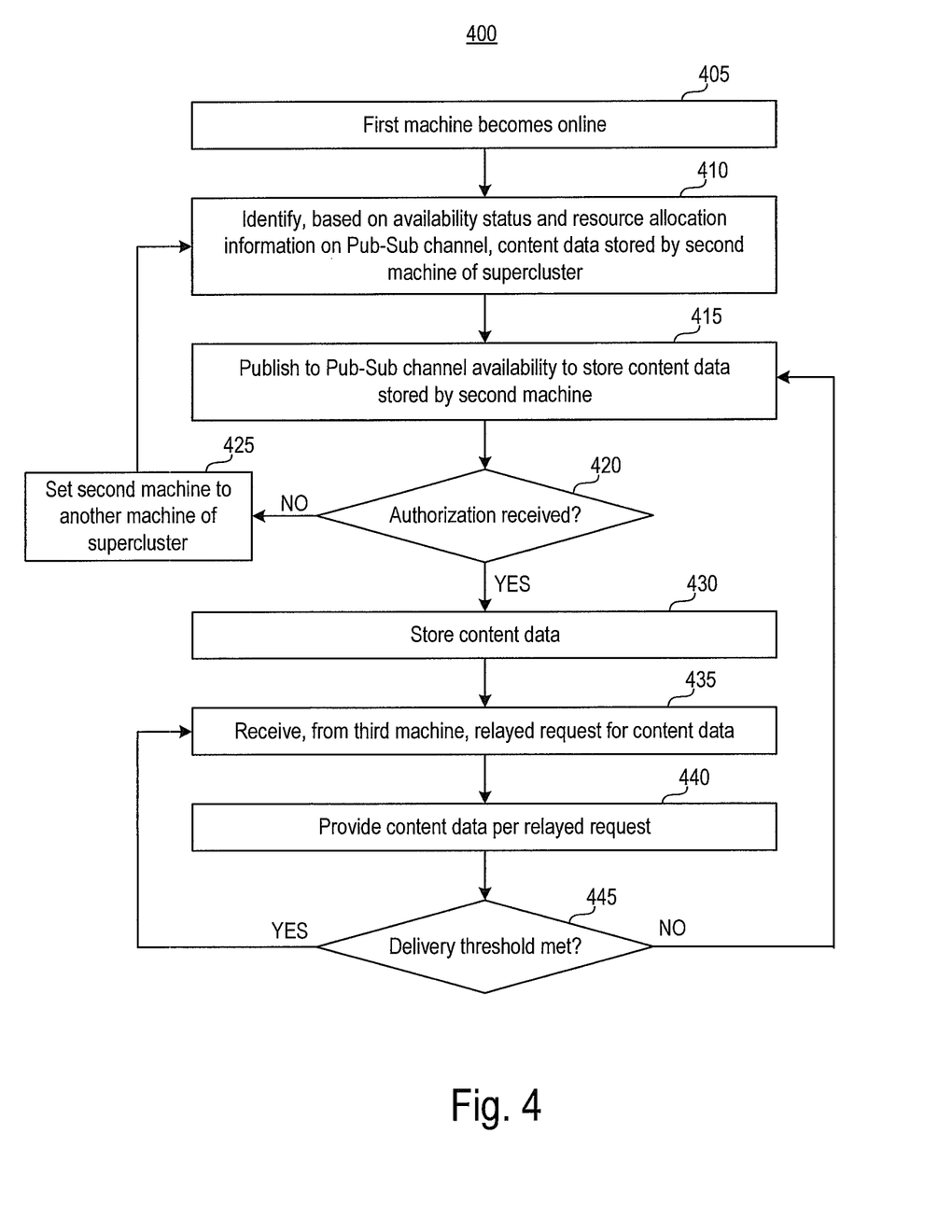
FIG. 4 is another flow diagram illustrating an exemplary method for providing communications within a supercluster.

FIG. 4 is a flow diagram illustrating an example of a method 400 for providing communications within the first supercluster 110 according to some arrangements. Referring to FIGS. 1-4, a machine of a supercluster can store content data (e.g., one or more slices) that is stored by another machine of the supercluster based on the availability status and the resource allocation information on a Pub-Sub channel of the supercluster. For example, a first machine (e.g., the machine 116) may offload at least a second machine (e.g., the machine 118) in the same supercluster 110 using the method 400.

At 405, the machine 116 becomes online. For example, the machine 116 may become online after a scheduled or unexpected shutdown. At this point, the content database 250 of the machine 116 is not storing any content data. The Pub-Sub circuit 220 of the machine 116 sets up the Pub-Sub channel 130 in the manner described. The machine 116 begins receiving, from the Pub-Sub channel 130, the availability status and the resource allocation information of the other machines in the first supercluster 110. The machine 116 can begin storing the availability status and the resource allocation information of the other machines in the first supercluster 110 in the status database 240 of the machine 116.

At 410, the processing circuit 210 of the machine 116 identifies the content data stored by a second machine (e.g., the machine 118) of the first supercluster 110 based on the availability status and the resource allocation information on the Pub-Sub channel 130. The identified content data may be offloaded to the machine 116. In one example, the content data of the machine 118 is identified responsive to the processing circuit 210 of the machine 116 determining that the machine 118 is currently storing the highest number of slices or popular slices among the machines of the first supercluster 110, or determining that the machine 118 stores a number of slices exceeding a predetermined threshold. In yet another example, the content data of the machine 118 is identified responsive to the processing circuit 210 of the machine 116 determining that the machine 118 has been online the longest among the machines of the first supercluster 110, or determining that the machine 118 has been online for a period of time exceeding a predetermined threshold. In yet another example, the content data of the machine 118 is identified responsive to the processing circuit 210 of the machine 116 determining that the machine 118 is a hotpot. In that regard, the machine 118 may publish on the Pub-Sub channel 130 that the machine 118 is being overloaded with requests from clients. In yet another example, the content data of the machine 118 is identified responsive to the processing circuit 210 of the machine 116 determining that the machine 118 is about to be offline. In that regard, the machine 118 may publish on the Pub-Sub channel 130 that the machine 118 is being turned offline or will soon be offline. In yet another example, the processing circuit 210 of the machine 116 selects one of the available machines of the first supercluster 110 randomly or pseudo-randomly. The content data (e.g., the slice) to be offloaded may be selected randomly or pseudo-randomly in some cases. In other cases, the content data to be offloaded may be popular content data stored in the second storage section of the content database 250 or content data that is not stored in the second storage section but is causing a hotspot at the machine 118.

At 415, the Pub-Sub circuit 220 of the machine 116 publishes on the Pub-Sub channel 130 that the machine 116 is available to store or offload the content data stored by the machine 118. For example, the Pub-Sub circuit 220 of the machine 116 may send an availability notification to the multicast address associated with the Pub-Sub channel 130, where the notification indicates that the machine 116 is available to store the content data stored by the machine 118.

Alternatively, block 410 may be omitted, and the Pub-Sub circuit 220 of the machine 116 publishes on the Pub-Sub channel 130 that the machine 116 is available to store any content data of any available machine of the first supercluster 110. A machine that is experiencing slowdown issues or hotspots may grant the authorization.

At 420, the processing circuit 210 of the machine 116 determines whether the Pub-Sub circuit 220 of the machine 116 received the authorization from the machine 118. The authorization may be any suitable messages received on the Pub-Sub channel 130. In other words, the machine 118 responds by publishing the authorization on the Pub-Sub channel 130. Responsive to determining that the authorization has not been received (420:NO), the processing circuit 210 of the machine 116 sets another machine of the first supercluster 110 at 425 to offload, where the another machine is identified at 410. On the other hand, responsive to determining that the authorization has been received (420:YES), the processing circuit 210 of the machine 116 stores the content data of the machine 118 at 430. Some of all of the content data stored by the machine 118 can be stored in the content database 250 of the machine 116.

The machine 118 may continue to store the offloaded content data. A URL associated with the content data or slice is now associated with both the machines 116 and 118. Alternatively, the machine 118 may no longer store the offloaded content data or may be offline after the content data has been offloaded to the machine 116. In that case, the content data is deemed to have been migrated to the machine 116. A URL associated with the content data or slice is diverted to the machine 116.

At 435, the machine 116 may receive, from a third machine (e.g., the machine 122) a relayed or forwarded request for the content data stored by the machine 116. The requested content data is the content data that the machine 116 offloaded from the machine 118. The machine 122 receives the request from the client 105 and relays the request to the machine 116 given that the machine 116 is offloading the machine 118. The machine 122 has knowledge that the machine 116 is offloading the machine 118 because the machine 122 is also monitoring and storing the data stream on the Pub-Sub channel 130. The data stream on the Pub-Sub channel 130 is available to all machines in the first supercluster 110 that subscribe to the Pub-Sub channel 130.

At 440, the machine 116 provides the content data per the relayed or forwarded request. At 445, the processing circuit 210 of the machine 116 determines whether a delivery threshold is met. The delivery threshold refers to a limit of content data that the machine 116 can store and delivery. The delivery threshold may be predetermined or set dynamically. The delivery threshold may be determined or set based on a size of the content database 250, the processing power of the processing circuit 210, network latency, a number of machines in the supercluster that are available, and the like.

Responsive to the processing circuit 210 of the machine 116 determining that the delivery threshold is met (445: YES), the machine 116 may receive additional relayed requests from machines of the first supercluster 110 (or receive requests directly from clients) for the content data stored in the content database 250, at 435. The machine 116 may no longer offload additional content data from other machines of the first supercluster 110 or store additional content data of the total library.

On the other hand, responsive to the processing circuit 210 of the machine 116 determining that the delivery threshold is not met (445:NO), the machine 116 may publish to the Pub-Sub channel 130 availability to store additional content data stored by the machine 118 (or another machine of the first supercluster 110) at 415.

Figure 5:
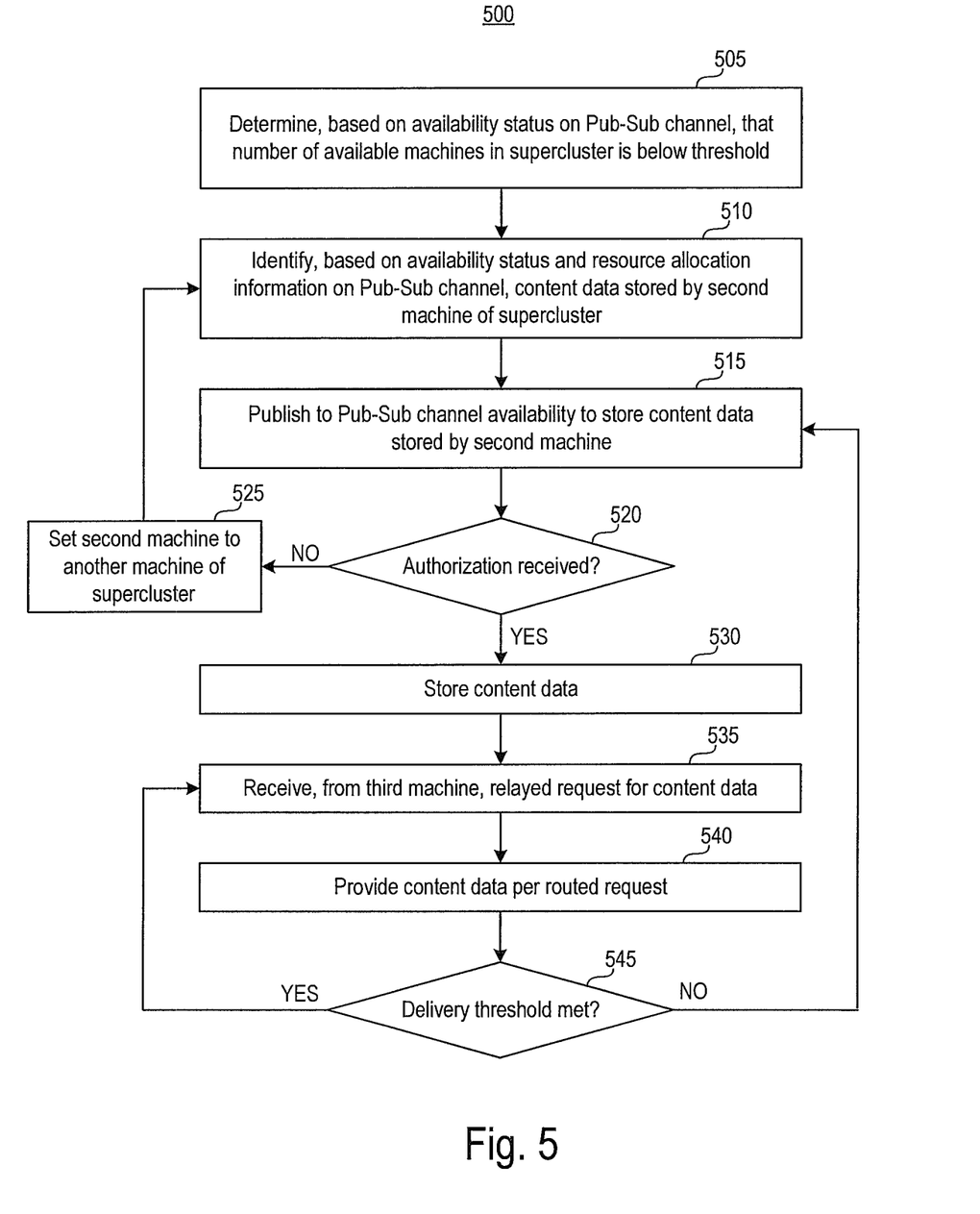
FIG. 5 is yet another flow diagram illustrating an exemplary method for providing communications within a supercluster.

Moreover, an available machine in a supercluster can offload an available, overloaded machine in the supercluster. FIG. 5 is a flow diagram illustrating an example of a method 500 for providing communications within the first supercluster 110 according to some arrangements. Referring to FIGS. 1-5, at 505, the processing circuit 210 of a first machine (e.g., the machine 116) determines, based on the availability status and the resource allocation information on the Pub-Sub channel 130, that a number of machines in the first supercluster 110 that are currently storing the content data (e.g., one or more slices) is below a threshold. The first supercluster 110 may have two or more machines storing a same slice for redundancy. A lack of machines storing a slice may result in hotspots for the machines that store the slice. In response, the machine 116 offloads the remaining machines storing the slice using the remainder of the method 500. Each of blocks 510-545 corresponds to one of blocks 410-445. In some arrangements, a slice is typically cached by a single machine. If a machine becomes a hotspot due to a large amount of peer traffic, the machine may shed certain slices onto some other machine on the same supercluster. In that sense, moving slices that are receiving little or no traffic may not improve the situation, and moving the most frequently requested slices may threaten to move the hotspot to another machine in the same supercluster. Thus, in some examples, slices that are neither the most frequently requested slices or the least frequently requested slices may be migrated as described herein.

Figure 6:
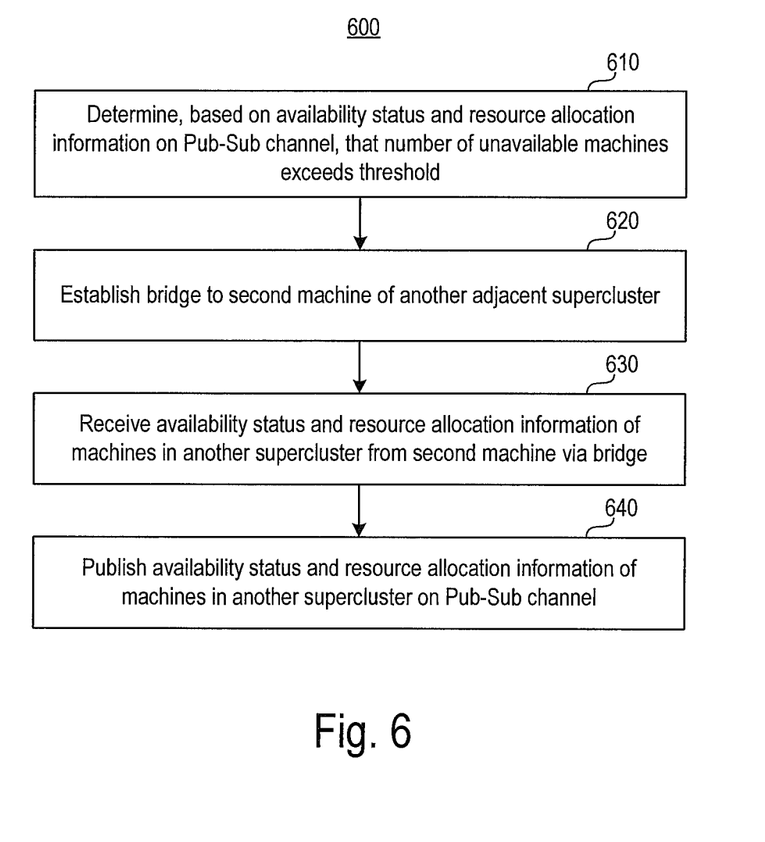
FIG. 6 is a flow diagram illustrating an exemplary method for providing communications among multiple superclusters.

FIG. 6 is a flow diagram illustrating an example of a method 600 for providing communications among multiple superclusters (e.g., the superclusters 110 and 140 of FIG. 1) according to some arrangements of the present disclosure. Referring to FIGS. 1-6, the availability status and the resource allocation information carried by the Pub-Sub channel 130 and the Pub-Sub channel 160 can be shared via the bridge 170. While the machines 120 and the 142 are the machines that support the bridge 170, one of ordinary skill in the art can appreciate that a bridge (such as but not limited to the bridge 170) can be established between any machine of the first supercluster 110 and any machine of the second supercluster 140.

At 610, a first machine (e.g., the machine 120) of the first supercluster 120 determines that a number of unavailable machines in the first supercluster 110 exceeds a threshold. The number of unavailable machines in the first supercluster 110 is determined based on the availability status provided on the Pub-Sub channel 130 of the first supercluster 110.

At 620, the machine 120 establishes the bridge 170 with a second machine (e.g., the machine 142) in the second supercluster 140 in response to determining that the number of unavailable machines in the first supercluster 110 exceeds the threshold. An example of the bridge 170 is a TCP connection. The machine 120 identifies the second supercluster 140 and/or the machine 142 based on network proximity to the first supercluster 110. Network proximity corresponds to a distance that packets travel between the machine 120 (or the first supercluster 110) and the machine 142 (or the second supercluster 140). The second supercluster 140 is adjacent to the first supercluster 110. For example, the machine 120 identifies that the second supercluster 140 and/or the machine 142 is adjacent to the first supercluster 110 by making a proximity request (e.g., a DNS request, or a request that uses the same or similar rendezvous system as that of the DNS request). The machine 120 receives a response (e.g., including an IP address) to the DNS request from a suitable DNS server and can analyze location information (e.g., the IP address) associated with the response to identify the second supercluster 140 as the nearest neighbor. In some arrangements, the machine 120 identifies a number (e.g., 2, 3, 5, or 10) of nearest neighboring superclusters and selects one that has the least hotpots, most processing power, the most machines available, the least latency, and the like. In some examples, the second supercluster 140 (e.g., the machine 142 or another suitable machine) determines that the second supercluster 140 is capable to offload the first supercluster 110 prior to establishing the bridge 170. For example, the second supercluster 140 (e.g., the machine 142 or another suitable machine) allows the bridge 170 to be established in response to determining that a number of unavailable machines in the second supercluster 140 exceeds a predetermined threshold (e.g., 30%, 50%, 60%, and the like) using the information conveyed on the Pub-Sub channel 160. In another example, the second supercluster 140 (e.g., the machine 142 or another suitable machine) allows the bridge 170 to be established in response to determining that a number of additional bridges of the second supercluster 140 does not exceed a predetermined threshold (e.g., 0, 1, 2, and the like).

At 630, the machine 120 receives via the bridge 170 the availability status and resource allocation information of each of the machines 142-150 of the second supercluster 140.

At 640, the machine 120 publishes on the Pub-Sub channel 130 of the first supercluster 110 the availability status and the resource allocation information of each of the machines 142-150 of the second supercluster 140. For example, the machine 120 sends the availability status and the resource allocation information of each of the machines 142-150 of the second supercluster 140 to the multicast address associated with the Pub-Sub channel 130. As such, the machines 114a-114e and 116-126 can receive and store the availability status and the resource allocation information of each of the machines 142-150 of the second supercluster 140 based on the multicast address.

In some arrangements, the machine 120 forming the end of the bridge 170 in the first supercluster 110 can filter data received from the second supercluster 140 such that only those slices that the available machines in the first supercluster 110 cannot support are made available to the Pub-Sub channel 130. Such processes may be transitional because as the first supercluster 110 first approaches the threshold for needing to off-load slices to the second supercluster 140, all slices still appear to be serviced from a machine in the first supercluster 110. As the bridge 170 is established, any further degradation of the machines of the first supercluster 110 does not cause additional slices to be allocated amongst the remaining machines of the first supercluster 110. Instead, the additional slices are filled from the appropriate machine(s) from the second supercluster 140. It is possible that a certain amount of relief of the remaining machines of the first supercluster 110 is accomplished at or before the moment that the bridge 170 is established (even without loss of additional machines in the first supercluster 110) by rolling back some of the recent re-allocated slices, thus causing those slices to be filled from the second supercluster 140. Illustrating with an example, there are 100 slices and 10 machines in a supercluster, such that machine 1 has slices 1, 11, 21, 31, and the like, machines 2 has slices 2, 12, 22, and the like. If machine 1 goes offline then slice 1 may be re-allocated to machine 2, slice 11 may be re-allocated to machine 2, and slice 21 may be re-allocated to machine 3, etc. If such processes are repeated for machines 2, 3, 4, and 5 going offline, each remaining machine is serving twice the regular number of slices. If the threshold to connect the bridge is reached, then it may be that the slices from machine 4 and 5, e.g., slices 4, 14, 24, and 34 and slices 5, 15, 25, and 35, may be considered "unavailable" at the supercluster. Those slices are instead handled from another supercluster. That is, the system described herein may behave as if the threshold for creating the bridge is 3 machines out of the supercluster, even though the bridge 170 is not actually created until 5 machines went offline in the supercluster.

The machines 114a-114e and 116-126 of the first supercluster 110 can forward requests received from clients to a machine of the second supercluster 140 based on the availability status and the resource allocation information of each of the machines 142-150 of the second supercluster 140 received via the bridge 170. For example, the machine 122 receives from the client 105 request for content data (e.g., a slice). The machine 122 saves the availability status and the resource allocation information of each of the machines 142-150 of the second supercluster 140 received via the Pub-Sub channel 130 in the content database 250 of the machine 122.

The machine 122 determines based on the availability status and the resource allocation information of each of the machines 142-150 on the Pub-Sub channel 130 that the content data (e.g., the requested slice) is stored by a machine (e.g., the machine 146) of the second supercluster 140. For example, the processing circuit 210 of the machine 122 searches the status database 240 of the machine 122, using the requested slice as criteria, to identify the machine 146 that stores the requested slice. In response, the machine 122 forwards the request to the machine 146.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 212(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, ASICs, FPGAs, DSPs, or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claim.

What is claimed is:

1. A supercluster, comprising:
a plurality of machines;
a publish-subscribe (Pub-Sub) channel to which each of the plurality of machines is subscribed,
wherein each of the plurality of machines is configured to:
publish availability status and resource allocation information to the Pub-Sub channel;
receive availability status and resource allocation information of at least another one of the plurality of machines via the Pub-Sub channel;
forward a request received from a client for content data to the another one of the plurality of machines based on the availability status and the resource allocation information on the Pub-Sub channel.

2. The supercluster of claim 1, wherein
the availability status indicates whether each of the plurality of machines is available to store content data; and
the resource allocation information identifies the content data stored by each of the plurality of machines.

3. The supercluster of claim 1, wherein the Pub-Sub channel comprises a multicast address.

4. The supercluster of claim 1, wherein forwarding the request received from the client for the content data to the another one of the plurality of machines based on the availability status and the resource allocation information on the Pub-Sub channel comprises:
receive, by a first machine of the plurality of machines, the request for the content data from the client;
determine, by the first machine, that the first machine does not store the content data;
determine, based on the availability status and the resource allocation information on the Pub-Sub channel, that the content data is stored on a second machine of the plurality of machines; and
forward the request to the second machine.

5. The supercluster of claim 1, wherein a first machine of the plurality of machines owns content data owned by a second machine of the plurality of machine based on the availability status and the resource allocation information on the Pub-Sub channel.

6. The supercluster of claim 5, wherein, to own the content data currently owned by the second machine, the first machine:
identifies, based on the availability status and the resource allocation information on the Pub-Sub channel, the content data owned by the second machine;

publishes, to the Pub-Sub channel, availability to own the content data owned by the second machine;

receives, from the second machine via the Pub-Sub channel, authorization from the second machine;

owning the content data owned by the second machine;

receives, from a third machine of the plurality of machines, a relayed request for the content data; and provides the content data in response to the relayed request.

7. The supercluster of claim 5, wherein, to own the content data currently owned by the second machine, the first machine:

determines, based on the availability status and the resource allocation information on the Pub-Sub channel, that a number of second machines currently storing the content data is below a threshold;

publishes, to the Pub-Sub channel, availability to own the content data;

receives, via the Pub-Sub channel, authorization from the second machines currently storing the content data;

owns the content data;

receives, from a third machine of the plurality of machines, a relayed request for the content data; and provides the content data in response to the relayed request.

8. The supercluster of claim 1, wherein a first machine of the plurality of machines is configured to establish a bridge to a second machine in another supercluster, wherein:

the another supercluster neighbors the supercluster; and the bridge is configured to relay, to the first machine, an availability status and resource allocation information of each of at least some machines of the another supercluster.

9. The supercluster of claim 8, wherein:

the first machine is configured to determine, based on the availability status of the plurality of machines on the Pub-Sub channel, that a number of unavailable machines of the plurality of machines exceeds a threshold; and the bridge is established in response to determining that the number of unavailable machines exceeds the threshold.

10. The supercluster of claim 8, wherein the bridge comprises a Transmission Control Protocol (TCP) connection.

11. The supercluster of claim 8, wherein the first machine is configured to publish the availability status and the resource allocation information of the at least some machines of the other supercluster on the Pub-Sub channel.

12. The supercluster of claim 11, wherein a third machine of the supercluster is configured to:

receive the request from the client for the content data;

determine, based on the resource allocation information of the at least some machines of the another supercluster on the Pub-Sub channel, that the content data is stored by a fourth machine of the another supercluster; and forward the request to the fourth machine.

13. A method for distributing loads across a plurality of machines of a supercluster, comprising:

publishing, by each of the plurality of machines of the supercluster, availability status and resource allocation information to a publish-subscribe (Pub-Sub) channel, wherein each of the plurality of machines is subscribed to the Pub-Sub channel;

receiving availability status and resource allocation information of at least another one of the plurality of machines via the Pub-Sub channel; and forwarding a request received from a client for content data to the another one of the plurality of machines based on the availability status and the resource allocation information on the Pub-Sub channel.

14. The method of claim 13, wherein the availability status indicates whether each of the plurality of machines is available to store content data; and the resource allocation information identifies the content data stored by each of the plurality of machines.

15. The method of claim 13, wherein forwarding the request received from the client for the content data to the another one of the plurality of machines based on the availability status and the resource allocation information on the Pub-Sub channel comprises:

receiving, by a first machine of the plurality of machines, the request for the content data from the client;

determining, by the first machine, that the first machine does not store the content data;

determining, based on the availability status and the resource allocation information on the Pub-Sub channel, that the content data is stored on a second machine of the plurality of machines; and forwarding the request to the second machine.

16. The method of claim 13, wherein a first machine of the plurality of machines is configured to establish a bridge to a second machine in another supercluster, wherein:

the another supercluster neighbors the supercluster; and the bridge is configured to relay, to the first machine, an availability status and resource allocation information of each of at least some machines of the another supercluster.

17. The method of claim 16, wherein:

the first machine is configured to determine, based on the availability status of the plurality of machines on the Pub-Sub channel, that a number of unavailable machines of the plurality of machines exceeds a threshold; and the bridge is established in response to determining that the number of unavailable machines exceeds the threshold.

18. The method of claim 16, wherein the bridge comprises a Transmission Control Protocol (TCP) connection.

19. The method of claim 16, wherein the first machine is configured to publish the availability status and the resource allocation information of the at least some machines of the other supercluster on the Pub-Sub channel.

20. A non-transitory computer-readable medium having computer-readable instructions such that, when executed, cause a processor of each of a plurality of machines of a supercluster to:

publish availability status and resource allocation information to a publish-subscribe (Pub-Sub) channel, wherein each of the plurality of machines is subscribed to the Pub-Sub channel;

receive availability status and resource allocation information of at least another one of the plurality of machines via the Pub-Sub channel; and forward a request received from a client for content data to the another one of the plurality of machines based on the availability status and the resource allocation information on the Pub-Sub channel.

* * * * *